United States Patent [19]
Besnard et al.

[11] Patent Number: 5,867,349
[45] Date of Patent: Feb. 2, 1999

[54] DRUM WITH FITTING LUGS FOR POSITIONING AND ATTACHING TO A DECK

[75] Inventors: Dominique Besnard, Auxerre; Bruno Fayolle, Lezinnes; Alain Leclaire, Hëry, all of France

[73] Assignee: Steli, Boulogne Cedex, France

[21] Appl. No.: 763,559

[22] Filed: Dec. 10, 1996

[30] Foreign Application Priority Data

Dec. 22, 1995 [FR] France .................................. 9515400

[51] Int. Cl.⁶ .......................... G11B 21/04; G11B 5/52
[52] U.S. Cl. .................................. 360/107; 360/84
[58] Field of Search ........................ 360/84, 85, 107, 360/109

[56] References Cited

U.S. PATENT DOCUMENTS

| | | | |
|---|---|---|---|
| 4,740,848 | 4/1988 | Schild et al. | 360/84 |
| 5,021,908 | 6/1991 | Morimoto et al. | 360/107 |
| 5,459,625 | 10/1995 | Ohshima et al. | 360/84 |

*Primary Examiner*—George J. Letscher
*Attorney, Agent, or Firm*—Joseph S. Tripoli; Joseph J. Laks; Daniel E. Sragow

[57] ABSTRACT

Deck and drum for a tape playback and/or recorder machines in which the assembly of deck and drum is made by way of lugs 19 of the drum cooperating with catch 14 of the deck. With such an arrangement the assembly of the deck and drum can be easily automated the drum being assembled by translation and then relative rotation of the deck and drum.

11 Claims, 4 Drawing Sheets

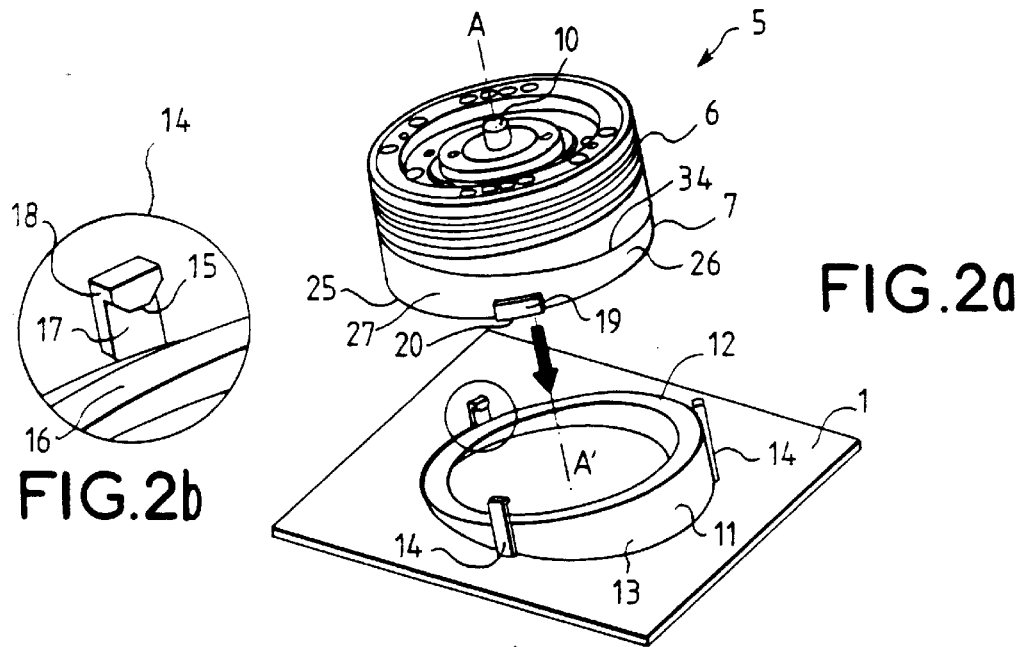
FIG.2a
FIG.2b
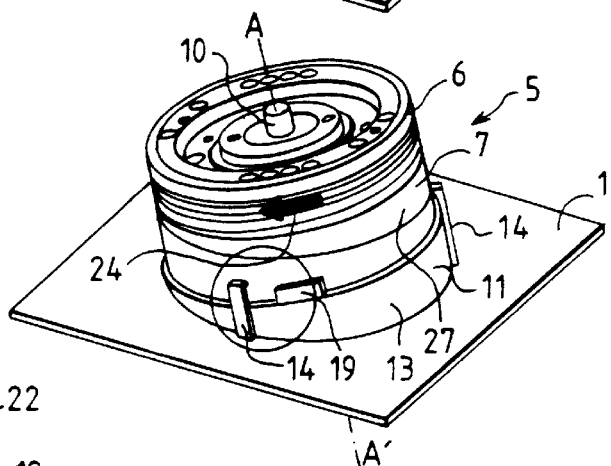
FIG.3a
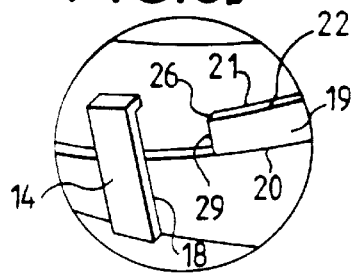
FIG.3b
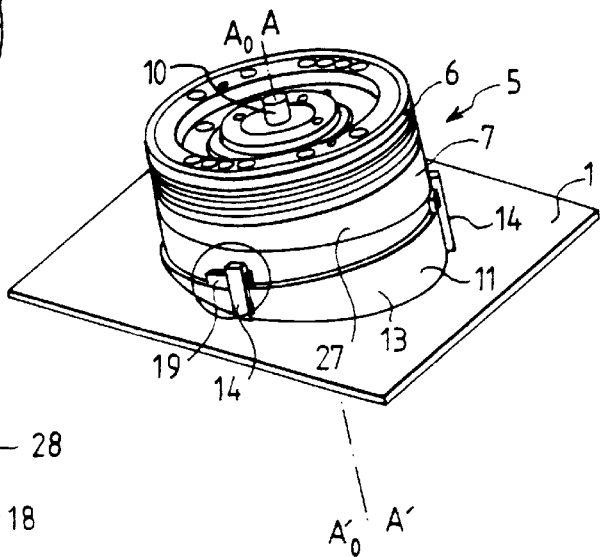
FIG.4a
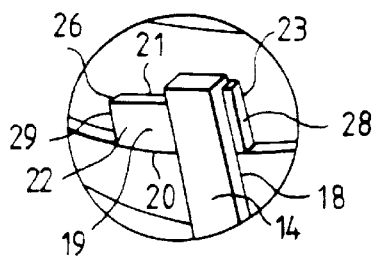
FIG.4b

DRUM WITH FITTING LUGS FOR POSITIONING AND ATTACHING TO A DECK

FIELD OF THE INVENTION

The invention relates to the field of magnetic tape playback and/or recorder machines. It relates more particularly to the fixing of a fixed drum whose function is especially to centre a rotating drum carrying magnetic heads, on a tape-holder deck.

PRIOR ART

The principle of operation and of numerous embodiments of video recorders are now known. For details regarding the context of the invention, the reader is referred for example to U.S. Pat. No. 5,086,361 relating to a rotating drum for a video recorder or again to U.S. Pat. No. 4,117,519 relating to a drum guide device for a video recorder.

The explanations given below in relation to the drum-holder deck and to the drum are merely intended to make it clear why very precise positioning of the drum with respect to the deck assumes great importance.

FIG. 1a represents a known example of a tape-holder deck. A deck 1 includes means 2 of driving a magnetic tape 3. It also includes means 4 of deploying and guiding the magnetic tape 3 around a drum 5. The drum 5 includes a rotating drum 6 commonly called the upper drum and a fixed drum 7 commonly called the lower drum. The upper rotating drum 6 carries, in a known manner, magnetic heads for reading and/or writing a signal carried by tracks 8 of the magnetic tape 3. The tracks 8 have a standardised inclination with respect to the tape 3. For this reason, the drum 5 is itself also inclined precisely by this angle with respect to the deck 1. Given the inclination of the drum, the tracks 8 are parallel to the plane of the circular locus described by the magnetic heads. In present-day video recorders, a video signal carried by the magnetic tape 3 is read by the magnetic heads carried by the rotating drum 6, whilst an audio signal carried by this same tape 3 is read by an audio head 9 commonly called the AC head carried by the deck 1. For good synchronisation of the audio and video signals, the length of the tape between the AC head and the video heads carried by the revolving drum should correspond to a precise time between the readings from each of these reading heads. With the speed of the tape being imposed by reading standards, it follows that the length of tape between the AC head and the video heads carried by the revolving drum is precisely determined. This implies a likewise precise relative positioning of the AC head and of the video heads carried by the revolving drum and similarly precise positioning of the fixed lower drum. The latter is the element for centring the axis of the rotating drum.

In order to clarify matters regarding the meaning of precise, the constraints laid down in respect of the positioning of the rotating drum will be given below, which constraints have repercussions on the fixed lower drum since it is the latter which centres the rotating drum.

These constraints will be explained with reference to FIGS. 1b and 1c.

FIG. 1b diagrammatically represents a magnetic tape 3 positioned with respect to an AC head 2 and a video head 33. The tracks 8 have been enlarged at the video head 33. Each section of track represents a frame of the video signal, that is to say a half-image. The useful recording areas are distributed over a tape width W included within the total width A of the tape. The tape 3 also includes a track 34 containing the frame synchronisation pips. These frame pips make it possible during replay to synchronise the position of the frames recorded on the video tape 3 with the video heads, such as the head 33, fixed on the rotating drum 6. Under the VHS standard, the distance X between the AC head and the video head is fixed at 79.244 mm. It is by adhering to this distance that read compatibility is ensured between tape recordings made on any type of video recorder.

In FIG. 1b it is seen that the frame read by the video head 33 depends on the position of this head within the width of the tape. Adherence to the proper distance X therefore depends not only on the relative distance of the heads 2 and of the axis AA' of the rotating drum, but also on the height of the tape with respect to the chassis deck 1. This height H represented in FIG. 1c depends on a tape guide 34 of the fixed drum 7. This tape guide takes the form of a helical recess with axis AA' made on the lateral surface of the fixed drum 7. The height of this tape guide, measured at the level of the head 33, depends on the indexation of the fixed drum 7, that is to say on its rotational position around the axis AA'. Hence it is seen that for proper operation of the video recorder, the axis AA' must be precisely positioned and the fixed drum 7 must be precisely positioned rotationally around the axis AA'. The figure of 79.244 mm corresponds to micron-level precision. The tolerances for adherence to this figure are not fixed but constructors try to reduce them as much as possible.

The precise inclination of the drum is obtained by means of an auxiliary deck carrying a structure inclined by the standardized inclination angle. The inclined structure carries centring pins which correspond with positioning bores drilled from the lower face of the lower drum. The pins and the bores are machined very precisely. This results in precise locating of the drum. Movement of the drum in an axial direction of the drum is subsequently prevented for example by means of screws threaded into holes in the auxiliary deck and screwed into tappings of the fixed drum 7.

For machines such as video recorders, mass-produced for the general public, the choice of a technical solution results not only from technical quality criteria for the product obtained, but also and importantly from economic criteria relating to the cost of the solution. In order to obtain properly dimensioned fixed drums at a reasonable cost, these drums are obtained, for example by cold forging, for example by plastic forming from a slug having substantially the desired diameter. For this reason, the outside form of the lateral face of the drum is necessarily a cylindrical surface, that is to say a surface generated by a straight line constrained to remain parallel to a fixed direction. As a general rule, this fixed direction is the centring axis of the rotating drum. This centring axis is in general perpendicular to the auxiliary deck defining the inclination of the rotating drum.

ADVANTAGES OF THE INVENTION

The fact that the drum has to be machined, in order to make the bores and tappings, increases its price. The screwing of the drum onto the auxiliary deck also increases the assembly costs.

The embodiment according to the invention aims to reduce the price of the lower drum and the cost of fitting it while retaining good precision of positioning. It also aims to ease the fitting and dismantling of the drum when the latter is necessary, in particular for the purposes of carrying out repairs. Finally, it is aimed at a drum and a deck which, at the manufacturing stage, can be assembled automatically, the drum being put in position via a translational movement, and then fixed by virtue of a relative rotational movement of the drum and deck.

BRIEF DESCRIPTION OF THE INVENTION

For all these purposes, the invention relates to a fixed lower drum of a magnetic tape recorder and/or playback machine, the fixed lower drum being intended to centre, along an axis AA', a rotating upper drum carrying one or more magnetic heads, the fixed lower drum having a lower face of which a part at least constitutes a surface for resting the drum on a deck intended to receive the fixed lower drum, a lateral peripheral surface, the axis AA' of the drum having, when it is fixed on the deck, a direction $A_0A'_0$, the fixed lower drum being furnished with means of fixing co-operating with means of fixing on the deck in order to fix the lower drum on the deck, drum characterized in that the means of fixing the fixed lower drum on the deck consist of one or more lugs projecting from a part of the lateral surface of the fixed lower drum, these lugs having at least one thrust surface substantially perpendicular to the axis AA', each thrust surface having a front edge in a direction $\vec{W}$ of rotation about AA', the periphery of the drum having for each thrust surface of the drum, an access channel leading from the lower surface of the drum to the front edge of one of the thrust faces, each channel allowing a fixed pin to meet up with the front edge of this thrust face starting from the lower face of the drums when the drum describes a movement in the course of which its axis AA' remains substantially parallel to a fixed direction, the thrust faces of the lugs allowing the fixing of the drum to the deck by a rotational movement about an axis in the direction $\vec{W}$, which movement is effected when the lower face is in the vicinity of the deck and when the axis AA' is in the vicinity of the axis $A_0A'_0$, the rotational movement bringing each thrust surface beneath a bearing face of the deck.

It also relates to the deck intended to receive the drum according to the invention, that is to say to a deck for receiving a fixed lower drum of a magnetic tape recorder and/or playback machine, the deck having an upper face of which a part at least is intended to constitute a receiving base for a rest surface of the fixed lower drum, the deck having means of fixing intended to cooperate with means of fixing of the fixed lower drum in order to fix the fixed lower drum on the deck, deck characterized in that the means of fixings of the deck consist of one or more elements for fixing to the deck, each element having a bearing surface substantially parallel to the upper face of the deck, the fixing elements being arranged equidistant from an axis.

It also relates to the assembly of deck and drum.

DESCRIPTION OF ALTERNATIVE EMBODIMENTS

The surface of the deck intended to receive the rest surface of the drum has been referred to as the receiving base of the deck. It will be noted that in the known embodiments, the receiving base is inclined by the standized inclination angle with respect to the overall plane of the deck. The rest surface of the drum is, under these conditions, perpendicular to the centring axis AA' of the drum. This arrangement is in no way obligatory, the drum can have a rest base inclined by the angle α with respect to the centring axis AA' of the drum. The deck is then flat. The desired inclination of the axis of the drum with respect to the tape 3 could also be obtained through a combination of the inclinations of the receiving base and of the rest base. The rotational movement which brings the drum into its final position of fixing to the deck is a rotational movement about an axis which could be defined as being perpendicular to the rest base if this rest base had a flat surface. Here again it will be noted that this is in no way obligatory. This base as well as the base receiving the deck may have surfaces which are for example conical or hemispherical.

As may be seen, the only constant reference of the drum is constituted by the axis AA' for centring the axis of the rotating upper drum. This axis corresponds on the fixed lower drum to the axis of the bearings carrying the spindle of the rotating drum, or alternatively in certain embodiments to the axis of a spindle carrying bearings of the rotating drum. This is one of the reasons for which, in the definition of the invention, the positioning of the thrust faces of the drum fixing means have been defined with respect to the axis AA' with the qualifier "substantially". The thrust faces are in principle parallel to the plane of the rest base when this base is flat. In this way, the bearing face of the deck exerts on the thrust face of the drum a force perpendicular to the rest base, the effect of this being to press the drum firmly against the deck. However, it will be understood that, in order to obtain this thrust, it is not necessary for the thrust face to be exactly parallel to the rest base. This face can make a small angle with the plane of the rest base. With this small angle, the thrust face then also constitutes a face for guiding the drum to the final position desired for the drum. Finally, a third reason for employing "substantially" stems from the fact that in one envisaged embodiment, the thrust face or faces exhibit an inclination with respect to the axis AA'. A parallel inclination of the bearing face of the deck then allows the bearing and thrust surfaces to contribute to both the radial and axial positioning of the drum. In short, when the drum has a flat rest surface, the thrust faces of the drum fixing means are almost parallel to the rest surface. Deviations from strict parallelism being due either to an inclination so as to provide axial guidance of the drum, or to an inclination so as to provide both axial and radial guidance of the drum. For similar reasons, the bearing faces of the deck fixing means have been described as substantially parallel to the upper face of the deck.

According to the invention, the lower drum is no longer forged and machined, but moulded and used straight from the foundry to be fixed to the auxiliary inclination deck. The applicant has observed that the precision which it was possible to obtain by moulding was compatible with the precision demanded for the positioning of the drum. Under these conditions it becomes possible to envisage shapes other than the cylindrical shape for the drum.

In an experimental embodiment of the invention, there is provision for one or more lugs sprouting from the lateral face of the drum. The radial thickness and axial height of these lugs preferably increases. The fitting of such a drum is carried out via a translational followed by a rotational movement of the drum. The lug or lugs then engage in catches of the auxiliary deck. With such an embodiment it is no longer necessary to machine the drum to obtain the fixing pieces.

Preferably, the height of at least one of the lugs increases with a direction of rotation of the fixed lower drum.

Preferably, the local radius of at least one of the lugs increases with a direction of rotation of the lower drum.

Preferably finally, both the height and local radius of the lug increase with a direction of rotation of the drum.

According to this experimental embodiment of the invention, the deck includes at least one catch intended to receive a lug of the drum according to the invention. The catches of the deck according to this embodiment have a lateral surface, a lower surface and an upper surface. These surfaces have a shape such that when the lower drum is fitted onto the deck, the lower surface of the lug of the drum is in contact with the lower face of the catch, the upper surface of the catch is in contact with the upper surface of the lug, and the lateral outside surface of the lug is in contact with the lateral surface of the catch. Naturally, it is clearly understood at this stage that from the standpoint of the invention it amounts to the same as the catch of the deck including a projecting part which engages in a hollow part of the drum or a hollow part in which a projecting part of the drum will be fixed. In the case in which the catch projects, the same terminology is retained in speaking of the lug of the lower drum, but in this case, the lug must be regarded as projecting from a hollow part of the outside lateral surface of the drum.

BRIEF DESCRIPTION OF THE DRAWINGS

An embodiment of the invention will now be described in connection with the appended drawings in which:

FIG. 2a represents an exploded perspective view of a drum and its receiving deck.

FIG. 2b is an enlarged view of a detail of FIG. 2a.

FIG. 3a represents a perspective view of the drum and the deck in contact with each other, but not yet in their assembled position.

FIG. 3b represents in perspective a detail of FIG. 3a.

FIG. 4a is a perspective view of a drum and a deck which are assembled with the means according to the invention.

FIG. 4b represents a detail of FIG. 4a.

DETAILED DESCRIPTION OF A PREFERED EMBODIMENT OF THE INVENTIONS

Figure 1A:
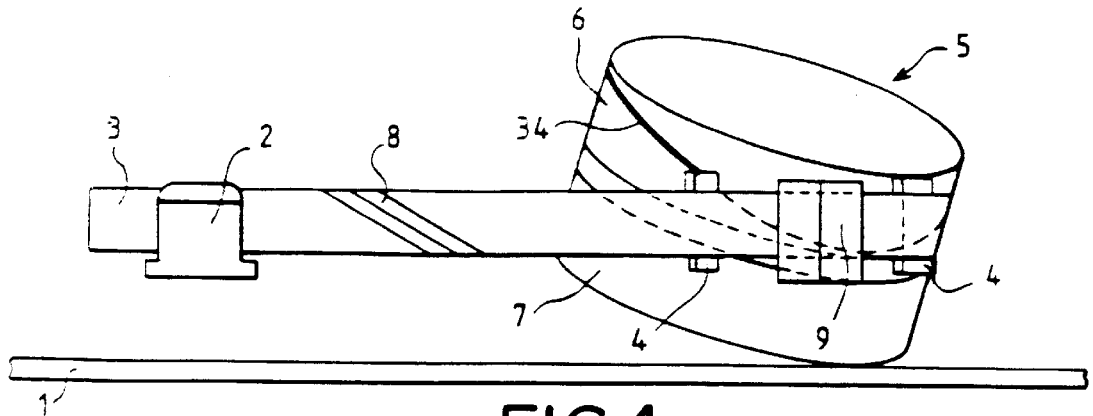
FIG. 1, already described, represent diagrammatic views intended to put the invention into its technical context.
Figure 1B:
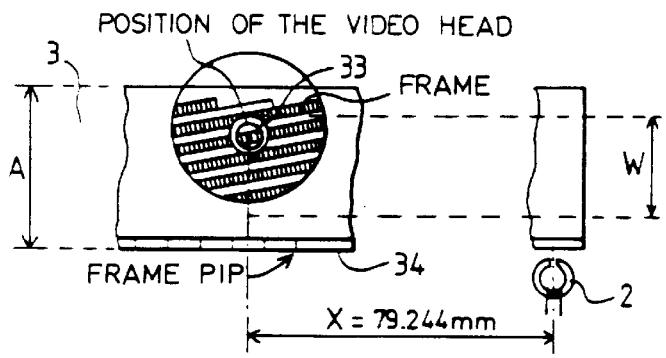
Figure 1C:
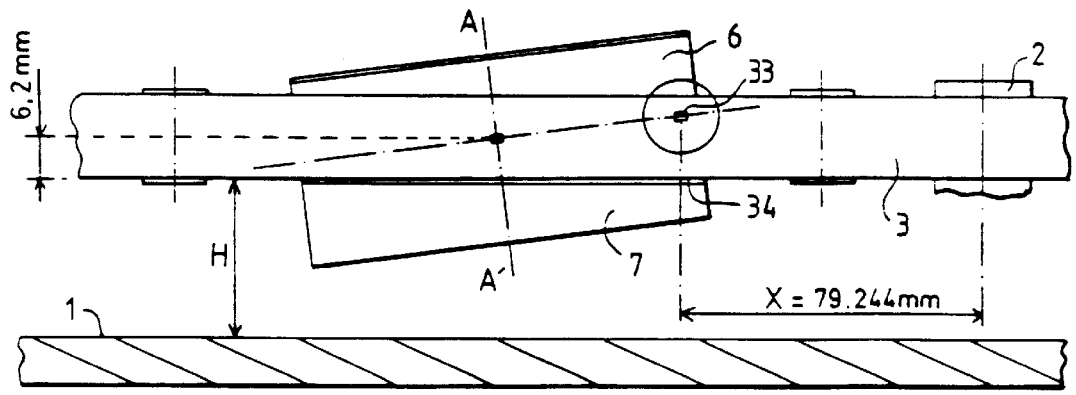

In FIGS. 2 to 6 the same items bear the same reference numerals. These reference numerals are the same as those of the items having the same function and described in connection with FIG. 1.

FIGS. 2.1, 3.1 and 4.1 each represent the same deck 1 and the same drum 5, these three figures together constituting a fitting scheme. The drum 5 includes a fixed drum 7 housing bearings of a rotating drum 6. The rotating drum 6 rotates about a spindle 10, itself centred on an axial line AA'.

The deck 1 includes a receptacle 11 of the fixed lower drum 7. The receptacle 11 includes a flat surface 12 lying in a plane perpendicular to the axis AA' of the rotating drum 6. The flat surface 12 is, in the example represented, the upper face of a lateral wall 13 of the receptacle 11. It constitutes the drum receiving base. The deck 1 includes means for fixing the fixed lower drum 7. These means consist of three catches 14, distributed at 120° around the axis AA'. In the example represented, the lateral wall 13 of the receptacle is cylindrical with axis AA', so that the catches 14 are integral with the receptacle 11 as represented in FIGS. 2 to 4. The detail of one of these catches is represented in FIGS. 2.2, 3.2 and 4.2. Each catch 14 includes a bearing surface 15 and a lower surface for hooking 16.

In the example represented, the lower hooking surface of the catch 14 coincides with the receiving base 12 of the fixed lower drum 7. This circumstance is due to the fact that, as will be seen later, the lower surface of the lugs of the lower drum 7 lies along the continuation of the lower surface 25 of the lower drum 7. The catch 14 lastly has a lateral surface 17 and a front face 18. This face 18 is termed "front" with respect to a direction of rotation about the axis AA'.

The fixed lower drum 7 is itself equipped with three lugs 19 arranged at 120° to one another. Details of these lugs are represented in FIGS. 3.2 and 4.2. Each lug 19 includes a lower surface 20, an upper surface 21 and a lateral surface 22. A rear part of at least one of the lugs 19 is equipped with an abutment 23 (FIG. 4b).

When speaking of front and rear parts of the catches 14 or of the lugs 19, this refers to parts which lead or trail with rotation about the axis AA' in the direction indicated by the arrow 24 represented in FIG. 3a.

The lower surface 20 of the lugs 19 lies along the continuation of the lower surface 25 of the fixed drum 7. The distance from the upper surface 21 to the lower surface 20 of the lug 19 diminishes with rotation in the direction of the arrow 24. In the example represented, the lateral surface 22 of the lug 19 has a radius which diminishes with rotation in the direction of the arrow 24.

In this embodiment, channels allowing a pin to pass from the lower surface 25 of the fixed lower drum 7 to the upper front edge 26 of the lugs 19 are constituted by the whole of the lateral surface 27 included between the rear boundary 28 of a lug 19 and the front boundary 29 of the next lug.

The fitting of the fixed lower drum 7 and its fixing to the receptacle 11 will now be explained.

Firstly, and as represented in FIG. 2.1, the fixed lower drum 7 is brought near by translating the receptacle 12. The lugs 19 are angularly offset from the catches 14. Hence, the catches 14 do not constitute a hindrance to the movement of the fixed lower drum 7. In the course of this movement, the catches 14 are substantially in contact with the lateral surface 27 of the fixed lower drum 7, which surface in this case constitutes the channel for the passage of the catches 14. The fixed lower drum 7 is next placed on the receptacle 12 as represented in, FIG. 3a. The fixed lower drum 7 is next rotated in the direction of the arrow 24 about the axis AA' as represented in FIG. 3a. At the end of the rotational movement of the fixed lower drum 7, the lugs 19 of the fixed lower drum 7 are engaged in the catches 14 of the deck 1. The bearing surface 15 of each catch 14 is in contact with the upper surface 21 of each lug 19, thus ensuring axial retention of the fixed lower drum 7. The lateral surfaces 17 of the catches 14 are in contact with the lateral surfaces 22 of the lugs 19 of the fixed lower drum 7, thus ensuring the centring of the fixed lower drum 7.

The bevelling of the upper 21 and lateral 22 surfaces of the lugs 19 allows relative clearance of the lugs 19 and of the catches 14 at the start of rotation, thus permitting relatively imprecise initial axial positioning of centring. Precise installation is obtained in the course of the rotational movement of the drum. Installation of the drum can thus be automated without particular difficulties in guidance by means of an arm carrying the drum 5.

A good indexing position of the fixed lower drum 7 was obtained by employing the abutment 23, which comes into abutment against the front surface 18 of one of the catches 14.

In the prototype embodiment, the three lugs had the same shapes and dimensions, with the exception of the abutment 23 on one of the lugs 19. It is however envisaged that another embodiment will have different heights of lugs 19 for each of the lugs 19, so as to prevent installation with incorrect indexing. In this case, the heights of the catches 14 are each in correlation with the height of the corresponding lug 19 when the drum is correctly indexed. The same result can be obtained with different thicknesses of lugs 19. In both cases, different thicknesses and/or heights, a lug 19 comes into abutment with a catch 14 before the rotational movement has terminated, thus triggering a warning.

DESCRIPTION OF OTHER EMBODIMENTS OF THE INVENTION

As indicated above, it is not necessary for the lug 19 to be a part projecting with respect to the body of the fixed lower drum 7, nor for the body of this drum to be cylindrical over the whole of its periphery.

Figure 5:
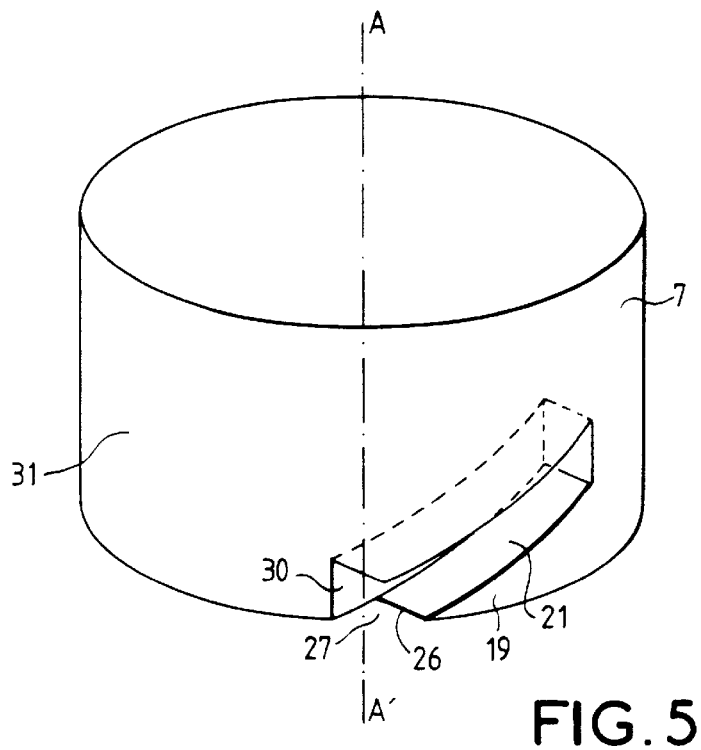
FIG. 5 represents a view of a drum according to the invention in another embodiment.

A fixed lower drum 7 is represented in FIG. 5 with a lug 19 projecting from a lateral surface 30 set back with respect to the outside peripheral lateral surface 31 of the fixed lower drum 7. The size of the lug relative to the drum has been magnified so as to elucidate the embodiment details.

According to the example represented in FIG. 5, the thrust surface 21 of the lug 19 is a surface perpendicular to the axis AA' of the fixed lower drum 7. A mid-line of this surface forms a spiral with axis AA'.

Figure 6:
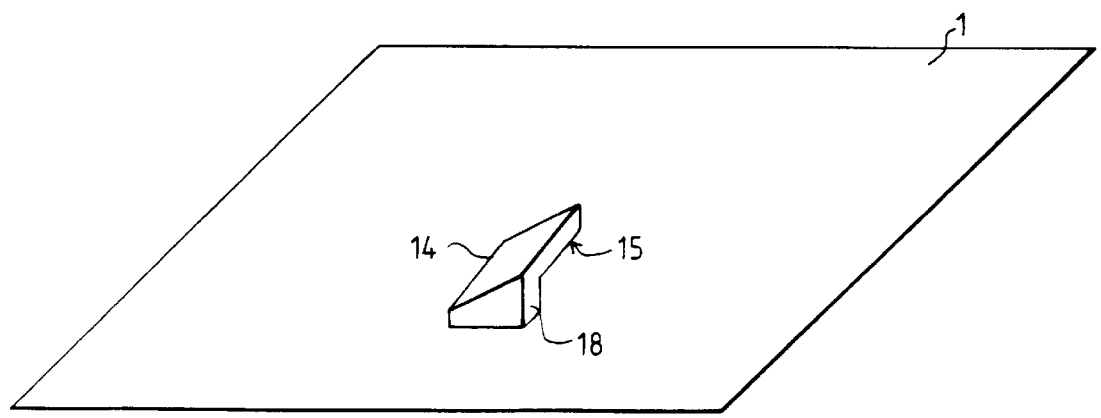
FIG. 6 represents a deck carrying a catch according to the invention to be used with the drum of FIG. 5.

FIG. 6 represents a catch 14 having a bearing face 15. The lower surface 15 is inclined so as to match the slope of the thrust face 21 of the lug 19. Passage of this catch 14 during installation of the drum is ensured by a channel 27 represented in FIG. 5.

Figure 7:
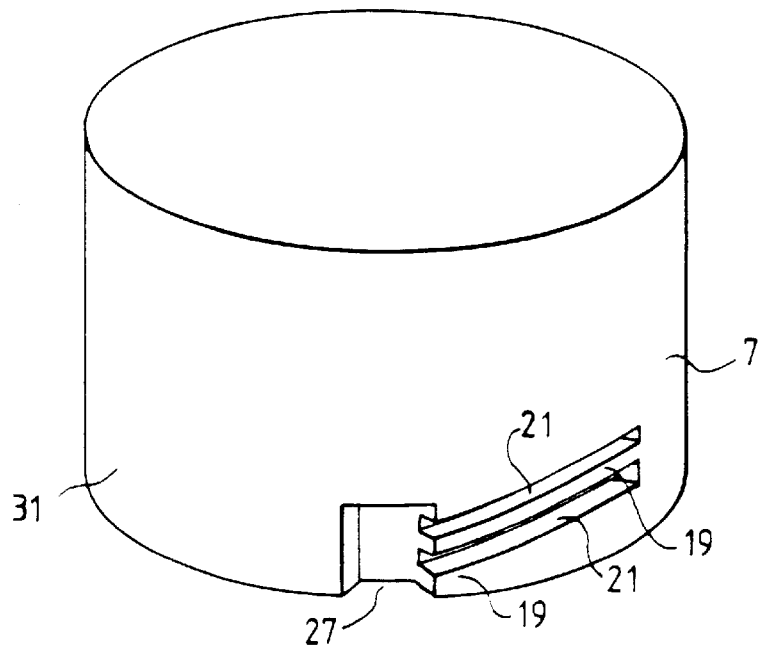
FIG. 7 represents a perspective view of a drum according to the invention including lugs superposed in an axial direction.

In another embodiment represented in FIG. 7, the lugs 19 are not only distributed at the periphery of the fixed lower drum 7, but are moreover tiered. An access channel 27 parallel to the axis AA' hollowed out from the peripheral surface 31 of the drum, provides access to grooves superposed along the axial direction AA'. The intervals between the grooves constitute lugs 19 whose upper faces 21 constitute thrust faces. In this embodiment, the catches 14 (not represented) have a notched face. The lower face of each notch constitutes a face for bearing of the catch on a thrust face of the lugs 19 of the fixed lower drum 7.

Naturally, it would also be possible to form, on the fixed lower drum 7, lugs having the same shape as those represented in FIG. 7, but in relief relative to the surface 31 of the drum. This embodiment has not been represented since it may be fully understood from the representation of FIG. 7.

In all cases, the lower face 20 of the lugs 19 can be used alone or together with a part of the lower surface 25 of the fixed lower drum 7 as surface for resting the drum on the deck.

Preferably, the lugs 19 are distributed symmetrically about the axis AA'.

Figure 8:
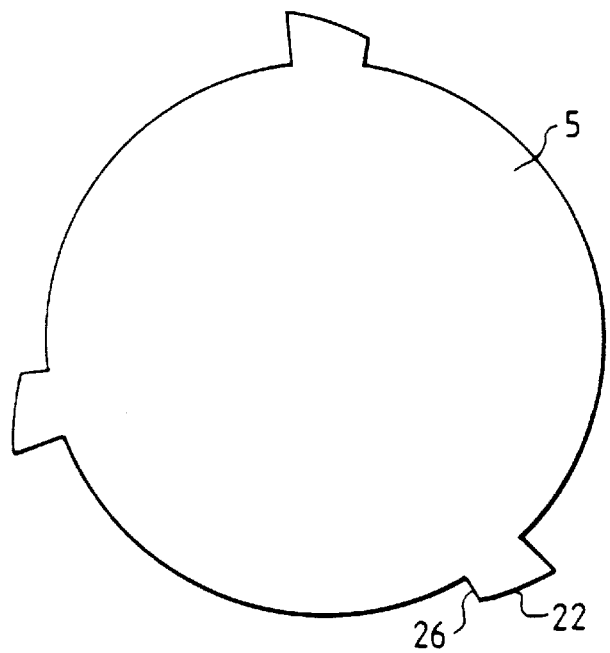
FIG. 8 represents a view from above of a drum including lugs having bevelled lateral surfaces.

Preferably, and as represented in plan view in FIG. 8, the lugs 19 are bevelled. This means that the distance from the lateral surface 22 of the lug 19 to the axis AA' is greater at the rear than at the front of the lug 19. Hence, some clearance is available between the catches 14 and the lugs 19 at the moment of the start of the rotation of the fixed lower drum 7. This clearance subsequently decreases, and the lateral face 22 of the lug 19 then constitutes a surface for guiding the fixed lower drum 7. Similarly, and as represented in FIGS. 2 to 7, the distance from the thrust face 21 of the catch 14 to the lower face 25 of the fixed lower drum 7 increases from the front to the rear so as to bear progressively beneath the thrust face of the catch 14. It is also possible to obtain axial and radial guidance with a single face. In this case, the thrust face 21 is inclined towards the axis AA'. The surfaces 21 are then frustoconical.

Naturally, it would amount to the same if the initial clearance before rotation were ensured by bevelling the lateral face 17 and/or bearing face 15 of one or more catches 14.

We claim:

1. A lower drum of a magnetic tape recorder and/or playback machine, said lower drum centering, along an axis, a rotating upper drum carrying one or more magnetic heads, said lower drum having a lower face of which at least a part constitutes a surface for mounting said lower drum on a deck intended to receive a lateral peripheral surface of said lower drum, the lower drum being equipped with means of attaching and positioning, cooperating with means of fixing on the deck in order to attach and position the lower drum on the deck, said drum characterized in that the means, of attaching and positioning said lower drum on the deck, consist of one or more lugs projecting from a part of the lateral surface of the lower drum, said one or more lugs having each at least one thrust surface substantially perpendicular to said axis, the thrust surface of each of the lugs allowing the attaching and positioning of the drum to the deck by engagement of each thrust surface with a corresponding catch, a rotational movement about said axis, which movement is effected when the lower face is in the vicinity of the deck, the rotational movement bringing each thrust surface beneath a bearing face of the deck.

2. A lower drum according to claim 1, characterized in that said one or more lugs project from the lateral peripheral surface of the lower drum.

3. A lower drum according to claim 1, characterized in that said one or more lugs project from a hollow recess of the lateral surface of the lower drum.

4. A lower drum according to claim 1, characterized in that the distance from a portion of the thrust face of said one or more lug, to the lower face of the lower drum increases monotonically.

5. A lower drum according to claim 1, characterized in that the radial distance from a portion of the lateral face of said one or more lugs to the axis of the lower drum increases monotonically.

6. A lower drum according to claim 1, characterized in that said one or more lugs are superposed in the axial direction.

7. A lower drum according to claim 1, characterized in that said one or more lugs are angularly, substantially equally distributed about said axis.

8. A lower drum according to claim 1, characterized in that a portion of the lower surface of at least one lug constitutes a portion of the rest surface of the lower drum.

9. An assembled deck of a recorder and/or a playback machine for a magnetic tape, the deck having an upper face of which a part at least is intended to- constitute a receiving base for a rest surface of a lower drum with which the deck is equipped, the deck having means of fixing and positioning intended to cooperate with means of fixing and positioning of the lower drum in order to attach and position the lower drum on the deck, the lower drum centering, along an axis, a rotating upper drum carrying one or more magnetic heads, the lower drum having a lower face of which a portion constitutes the surface for resting the drum on the deck, the assembled deck characterized in that the means of fixing the lower drum on the deck consist of one or more lugs projecting from a part of the lateral surface of the lower drum, said one or more these lugs having at least one thrust surface substantially perpendicular to said axis, each thrust surface allowing the attachment of the drum to the deck by a rotational movement about said axis, which movement is effected when the lower face is in the vicinity of the deck, the rotational movement bringing each thrust surface beneath and in engagement with a bearing face of a fixing element of the deck and in that the means of attaching to the deck consist of one or more fixing elements, each element having its bearing surface substantially parallel to the upper face of the deck, the fixing elements being arranged substantially equidistant from said axis.

10. An assembled deck according to claim 9, characterized by a free space between the thrust face of a lug and the bearing face of a fixing element of the deck, said space varying monotonically.

11. An assembled deck according to claim 9, characterized by a free space between a lateral face of a fixing element of the deck and a lateral face of a lug, said space varying monotonically.

* * * * *